(12) United States Patent
McConnell et al.

(10) Patent No.: US 7,068,644 B1
(45) Date of Patent: Jun. 27, 2006

(54) WIRELESS ACCESS GATEWAY TO PACKET SWITCHED NETWORK

(75) Inventors: Von K. McConnell, Leawood, KS (US); Rakesh C. Saxena, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1091 days.

(21) Appl. No.: 09/751,951

(22) Filed: Dec. 29, 2000

Related U.S. Application Data

(60) Provisional application No. 60/185,601, filed on Feb. 28, 2000, provisional application No. 60/187,273, filed on Mar. 6, 2000.

(51) Int. Cl.
*H04L 12/66* (2006.01)

(52) U.S. Cl. ...................... 370/352; 370/407

(58) Field of Classification Search ............... 370/338, 370/349, 335, 352, 354, 355, 356, 401, 400, 370/466, 467, 238, 422.1, 465, 328, 329, 370/410; 455/88, 550.1, 556.1, 436, 437
See application file for complete search history.

(56) References Cited

U.S. PATENT DOCUMENTS

| | | | |
|---|---|---|---|
| 5,592,470 A | | 1/1997 | Rudrapatna et al. |
| 5,600,633 A | | 2/1997 | Jaisingh et al. |
| 5,630,204 A | | 5/1997 | Hylton et al. |
| 5,633,868 A | | 5/1997 | Baldwin et al. |
| 5,704,003 A | * | 12/1997 | Kleijn et al. ............... 704/220 |
| 5,729,536 A | | 3/1998 | Doshi et al. |
| 5,890,064 A | * | 3/1999 | Widergen et al. ........... 455/445 |
| 5,970,062 A | | 10/1999 | Bauchot et al. |
| 6,009,096 A | | 12/1999 | Jaisingh et al. |
| 6,018,521 A | | 1/2000 | Timbs et al. |
| 6,028,933 A | | 2/2000 | Heer et al. |
| 6,034,950 A | | 3/2000 | Sauer et al. |
| 6,138,022 A | | 10/2000 | Strawczynski et al. |
| 6,208,620 B1 | * | 3/2001 | Sen et al. ................... 370/231 |
| 6,249,516 B1 | * | 6/2001 | Brownrigg et al. ......... 370/338 |
| 6,373,837 B1 | * | 4/2002 | Kleyman et al. ........... 370/352 |
| 6,490,451 B1 | * | 12/2002 | Denman et al. ............ 455/436 |
| 6,515,985 B1 | * | 2/2003 | Shmulevich et al. ........ 370/356 |
| 6,570,871 B1 | * | 5/2003 | Schneider .................... 370/356 |
| 6,594,258 B1 | * | 7/2003 | Larson et al. ............... 370/353 |

(Continued)

OTHER PUBLICATIONS

Audsley, N.C., et al., "Fixed Priority Pre-emptive Scheduling: An Historical Perspective", *Real-Time Systems*, 8, Kluwer Academic Publishers, Boston, pp. 173-198, (1995).

(Continued)

*Primary Examiner*—Hassan Kizou
*Assistant Examiner*—Ricardo Pizarro

(57) ABSTRACT

A wireless access gateway provides a telecommunications link between a packet switched network and a base transceiver station (BTS), the BTS enabling wireless communication with mobile stations in a wireless coverage area. A session manager controls sessions through the packet switched network, and a mobility server performs mobility management for mobile stations being served by wireless access gateways. A wireless access gateway includes a packet agent, a coding agent, a radio frequency (RF) manager, and a signaling control agent. The packet agent packetizes frames from the BTS into packets and depacketizes packets into frames for the BTS. The coding agent transcodes content contained in packets from a first format to a second format. The RF manager performs RF management of the BTS. The signaling control agent sends queries to and receives responses from the session manager to control the operation of the wireless access gateway.

21 Claims, 2 Drawing Sheets

U.S. PATENT DOCUMENTS

| | | | | |
|---|---|---|---|---|
| 6,625,153 B1* | 9/2003 | Liu | ........................ | 370/395.1 |
| 6,711,417 B1* | 3/2004 | Gorman et al. | .......... | 455/550.1 |
| 6,721,306 B1* | 4/2004 | Farris et al. | ................ | 370/352 |
| 6,760,602 B1* | 7/2004 | Tangorra et al. | ............ | 455/561 |
| 6,771,967 B1* | 8/2004 | Yang | ........................ | 455/450 |
| 6,910,074 B1* | 6/2005 | Amin et al. | ................ | 709/227 |

OTHER PUBLICATIONS

Bettati, R., et al., "End-to-End Scheduling to Meet Deadlines in Distributed Systems", *Proceedings of the 12th International Conference on Distributed Computing Systems*, Yokohama, Japan, 8 p., (Jun. 1992).

Binns, P., "Incremental Rate Monotonic Scheduling for Improved Control System Performance", *Real-Time Applications Symposium*, Honeywell Technology Center, 11 p., (Jun. 1997).

Binns, P., "Scheduling Slack in MetaH", *Real-Time Systems Symposium, Work in Progress Session*, Honeywell Technology Center, 4 p., (Dec. 1996).

Garcia, J.J., et al., "Optimized Priority Assignment for Tasks and Messages in Distributed Hard Real-Time Systems", *IEEE*, pp. 124-132, (1995).

Gerber, R., et al., "Semantics-Based Compiler Transformations for Enhanced Schedulability", *IEEE*, pp. 232-242, (1993).

Gertz, M.W., et al., "A Human-Machine Interface to Support Reconfigurable Software Assembly for Virtual Laboratories", *IEEE Robotics and Automation Magazine*, 1 (4), pp. 1-8, (Dec. 1994).

Gillies, D.W., et al., "Scheduling Tasks with and/or Precedence Constraints," *SIAM J. Comput.*, 24 (4), Society for Industrial and Applied Mathematics, pp. 797-810, (Aug. 1995).

Harbour, M.G., et al., "Fixed Priority Scheduling of Periodic Tasks with Varying Execution Priority", *IEEE*, pp. 116-128, (1991).

Lehoczky, J., et al., "The Rate Monotonic Scheduling Algorithm: Exact Characterization And Average Case Behavior", *IEEE*, pp. 166-171, (1989).

Lehoczky, J.P., et al., "An Optimal Algorithm for Scheduling Soft-Aperiodic Tasks in Fixed-Priority Preemptive Systems", *IEEE*, pp. 110-123, (1992).

Lehoczky, J.P., et al., "Enhanced Aperiodic Responsiveness in Hard Real-Time Environments", *IEEE*, pp. 261-270, (1987).

Leung, J.Y., et al., "On the Complexity of Fixed-Priority Scheduling of Periodic, Real-Time Tasks", *Performance Evaluation 2*, North-Holland Publishing Company, pp. 237-250, (1982).

Liu, C.L., et al., "Scheduling Algorithms for Multiprogramming in a Hard-Real-Time Environment", *Journal of the Association for Computing Machinery*, 20, (1), pp. 46-61, (Jan. 1973).

Luqi, "Real-Time Constraints In a Rapid Prototyping Language", *Computer Lang.*, 18 (2), Computer Science Department, Naval Postgraduate School, Monterey, CA, pp. 77-103, (1993).

McConnell, D.J., et al., "Reengineering a Single Threaded Embedded Missile Application Onto a Parallel Processing Platform Using MetaH", *IEEE, Proceedings of the 4th WPDRTS*, pp. 57-64, (1996).

Mok, A.K., et al., "Synthesis of a Real-Time Message Processing System with Data-driven Timing Constraints", *IEEE*, pp. 133-143, (1987).

Penix, J., et al., "Verification of Time Partitioning in the DEOS Scheduler Kernel", *The 22nd International Conference on Software Engineering*, Limeric, Ireland, ACM Press, pp. 1-10, (Jun. 4, 2000).

Saksena, M., et al., "Design and Implementation of Maruti-II", *In: Principles of Real-Time Systems, Chapter 4*, Sang Son, Ed., pp. 72-102, (1994).

Saksena, M., et al., "Guidelines for Automated Implementation of Executable Object Oriented Models for Real-Time Embedded Control Systems", *IEEE*, pp. 240-251, (1997).

Sha, L., et al., "Priority Inheritance Protocols: An Approach to Real-Time Synchronization", *IEEE Transactions on Computers*, 39 (9), pp. 1175-1185, (Sep. 1990).

Sha, L., et al., "Solutions For Some Practical Problems In Prioritized Preemptive Scheduling", *IEEE*, pp. 181-191, (1986).

Spuri, M., et al., "How to Integrate Precedence Constraints and Shared Resources in Real-Time Scheduling", *IEEE Transactions on Computers*, 43 (12), pp. 1407-1412, (Dec. 1994).

Stoyenko, A.D., "A Schedulability Analyzer for Real-Time Elucid", *IEEE*, pp. 218-227, (1987).

Sun, J., et al., "Synchronization Protocols in Distributed Real-Time Systems", *IEEE*, pp. 38-45, (1996).

Vestal, S., "Fixed-Priority Sensitivity Analysis for Linear Compute Time Models", *IEEE Transactions on Software Engineering*, 20 (4), pp. 308-317, (Apr. 1994).

Vestal, S., "MetaH Support for Real-Time Multi-Processor Avionics", *Joint Workshop on Parallel and Distributed Real-Time Systems*, Geneva, Switzerland, 10 p., (Apr. 1997).

Vestal, S., "Mode Changes in a Real-Time Architecture Description Language", *Second International Workshop on Configurable Distributed Systems*, 11 p., (Mar. 1994).

Vestal, S., et al., "Scheduling and Communication in MetaH", *Proceedings of the Real-Time Systems Symposium*, Raleigh-Durham, NC, 7 p., (Dec. 1993).

Xu, J., et al., "Scheduling Processes with Release Times, Deadlines, Precedence, and Exclusion Relations", *IEEE Transactions on Software Engineering*, 16, (3), pp. 360-369, (Apr., 1994).

* cited by examiner

WIRELESS ACCESS GATEWAY TO PACKET SWITCHED NETWORK

REFERENCE TO RELATED APPLICATIONS

The inventors claim priority to the following provisional applications, each of which is hereby incorporated herein by reference in its entirety:

U.S. Provisional Patent Application No. 60/185,601, filed Feb. 28, 2000, entitled "Next Generation Service and Mobility Control," and assigned to the assignee of the present invention; and U.S. Provisional Patent Application No. 60/187,273, filed Mar. 6, 2000, also entitled "Next Generation Service and Mobility Control," and assigned to the assignee of the present invention.

In addition, U.S. patent application Ser. No. 09/708,836, filed Nov. 8, 2000, entitled "Method and System for Providing Services in Communications Networks," and assigned to the assignee of the present invention, is hereby incorporated herein by reference in its entirety.

BACKGROUND OF THE INVENTION

1. Field of the Invention

The present invention relates in general to telecommunications networks. More particularly, the present invention relates to a wireless access gateway to a packet switched network and to methods for using a wireless access gateway for transmitting content to and from a mobile station via a packet switched network.

2. Description of Related Art

The Public Switched Telephone Network (PSTN) was built based on a paradigm in which functions were centered on the switch. PSTN switches typically both carry traffic, such as voice or data, and perform the signaling needed to set up connections through the network. More particularly, most switches use a Time Division Multiplex (TDM) architecture. This architecture has a number of disadvantages, however. First, the TDM architecture typically has a relatively low bandwidth and is generally optimized to carry voice traffic. Second, the current practice of reserving circuits to route calls is inefficient and requires complex traffic modeling to ensure that capacity can meet demand. Third, the control requirements and capability sets for the switches tend to vary greatly from vendor to vendor. This makes the switches difficult to update, maintain, and interwork with other network elements. Conventional switches also tend to be very expensive.

Recently, a Next Generation Network (NGN) approach has been suggested as a new approach to telecommunications network architecture. Representative of NGN suggestions are the specifications and proposals of such organizations as the Third Generation Packet Partnership Number 2 (3GPP2) and the Mobile Wireless Internet Forum (MWIF). In general, the NGN approach is based on packet switching instead of circuit switching. Moreover, in the NGN approach, the signal control logic is independent of and managed separately from the packet switching hardware. In particular, the NGN may be conceptualized as made up of a Connection Control Plane, a Call Control Plane, and a Service Plane.

The Connection Control Plane is made up of the network elements, such as the packet switching hardware, that carry the traffic, which may be voice, data, video or other media. However, unlike the switches of the PSTN, the network elements in the Connection Control Plane have little or no intelligence. Instead, a "Call Agent" or "Session Manager" in the Call Control Plane sets up and controls all the calls through the Connection Control Plane. The advantage of the separation of the Connection Control Plane from the Call Control Plane is that calls can be controlled independently of the hardware being used to carry the traffic.

The Service Plane consists of network elements, such as "Application Servers," that provide the data and service logic needed to provide various telecommunications services. For example, when asked to route a call for a given subscriber, the Session Manager would communicate with the Application Server to determine what services may be implicated by the request and to invoke the service logic needed to provide the service.

With the rapid growth and importance of wireless networks, it is desirable to integrate wireless communication functionality into the NGN approach. However, the integration of wireless communication is more complicated, because the elements in conventional wireless networks perform many more functions than the elements in conventional wireline networks. For example, the switching elements in conventional wireless networks, mobile switching centers (MSCs), perform mobility management functions in addition to switching functions. Moreover, in code division multiple access (CDMA) networks, network elements, such as MSCs and base station controllers (BSCs) typically perform a number of physical layer functions to process the signals for transmission over the air interface. In the first of these physical layer functions, a vocoder is typically used to process voice content to provide a compressed digital voice signal. Typical vocoders used for CDMA include code-excited linear predictive (CELP) vocoders, which use a fixed coding rate. More recently, CDMA systems have begun to use vocoders based on relaxed code-excited linear predictive (RCELP) algorithms, which allow for variable rate coding. For example, enhanced variable rate codec (EVRC) technology has come to be used in CDMA systems. EVRC is described in the IS-127 specification of the Telecommunications Industries Association/Electronic Industries Association's (TIA/EIA. The IS-127 specification, which is titled "Enhanced Variable Rate Codec, Speech Service Option 3 for Wideband Spread Spectrum Digital Systems" and was published on Jan. 1, 1997, is fully incorporated herein by reference.

The vocoded signal is then typically processed in various ways, such as by convolution coding, repetition, and block interleaving, to reduce errors that may be caused by transmission over the air interface. This processed signal is then typically scrambled using the user's electronic serial number (ESN). The next step is orthogonal spreading, in which an orthogonal spreading code, typically a Walsh code, is applied to the scrambled signals. The particular orthogonal spreading code defines the CDMA channel of the signal. After orthogonal spreading, each channel is then quadrature spread using a long pseudorandom noise (PN) code. After filtering, the signal is then ready to be transmitted over the air interface.

In addition, the wireless network typically performs physical layer processing of signals that it receives over the air interface. The physical layer processing of received signals is typically the reverse of the processing used to prepare signals for transmission.

Accordingly, a need exists for integrating wireless telecommunications into the NGN approach in such a way that the physical layer processing needed for CDMA communication may be accommodated.

SUMMARY OF THE INVENTION

In a first principal aspect, an exemplary embodiment of the present invention provides a wireless access gateway that provides a telecommunications link between a base transceiver station (BTS), which provides a wireless coverage area for wireless communication with at least one mobile station, and a packet switched network. The wireless access gateway comprises a packet agent in communication with the BTS and with the packet network, a coding agent in packet communication with the packet agent, a radio frequency (RF) manager in packet communication with the packet agent, and a signaling control agent in packet communication with the packet agent. The packet agent packetizes frames it receives from the BTS into packets. The packet agent also depacketizes packets it receives into frames for the BTS. The coding agent transcodes content contained in packets from a first format to a second format. The RF manager performs RF management of the BTS. The signaling control agent controls the packet agent.

In a second principal aspect, an exemplary embodiment of the present invention provides a method for transmitting content from a mobile station to a destination, via a packet switched network and a circuit switched network. In accordance with the method, first-format content is received from the mobile station over an air interface. First-format content is the content in a first format. The first-format content is packetized into at least one packet. The at least one packet is transmitted, via the packet switched network, to a trunk gateway, which is connected to the circuit switched network. The trunk gateway transcodes the first-format content into second-format content, wherein the second-format content is the content in a second format. The trunk gateway transmits the second-format content to the destination, via the circuit switched network.

In a third principal aspect, an exemplary embodiment of the present invention provides a method for transmitting content to a mobile station via a packet switched network and a circuit switched network. In accordance with the method, first-format content is received from the circuit switched network. The first-format content is the content in a first format. The first-format content is packetized into at least one first-format packet. The at least one first-format packet is transmitted, via the packet switched network, to a coding agent. The coding agent transcodes the at least one first-format packet into at least one second-format packet, with the least one second-format packet carrying the content in a second format. The at least one second-format packet is depacketized to provide second-format content. The second-format content is transmitted over an air interface to the mobile station.

In a fourth principal aspect, an exemplary embodiment of the present invention provides a method for using a wireless access gateway to originate a call from a mobile station, via a packet switched network. The wireless access gateway includes a packet agent and a signaling control agent. In accordance with the method, a call origination request from said mobile station is received over an air interface. A packet agent packetizes the call origination request to provide at least one call origination packet. The packet agent transmits the at least one call origination packet to a signaling control agent. The packet agent receives at least one instruction packet from the signaling control agent. The at least one instruction packet instructs the packet agent to transmit packets containing content from said mobile station to a destination address in the packet switched network.

In a fifth principal aspect, an exemplary embodiment of the present invention provides a method for setting up a call, via a circuit switched network and a packet switched network, to a mobile station that is operating in a wireless coverage area being served by a wireless access gateway. The wireless access gateway includes a packet agent, a coding agent, and a signaling control agent. In accordance with the method, a session manager receives, via a signaling gateway, a request from the circuit switched network to terminate a call to the mobile station. The session manager sends, via the packet switched network, a first instruction message to a trunk gateway, which is connected to the circuit switched network. The first instruction message instructs the trunk gateway to transmit packets containing content from the circuit switched network to a destination address in the packet switched network, wherein the destination address corresponds to the coding agent.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

A. EXEMPLARY SYSTEM ARCHITECTURE

Figure 1:
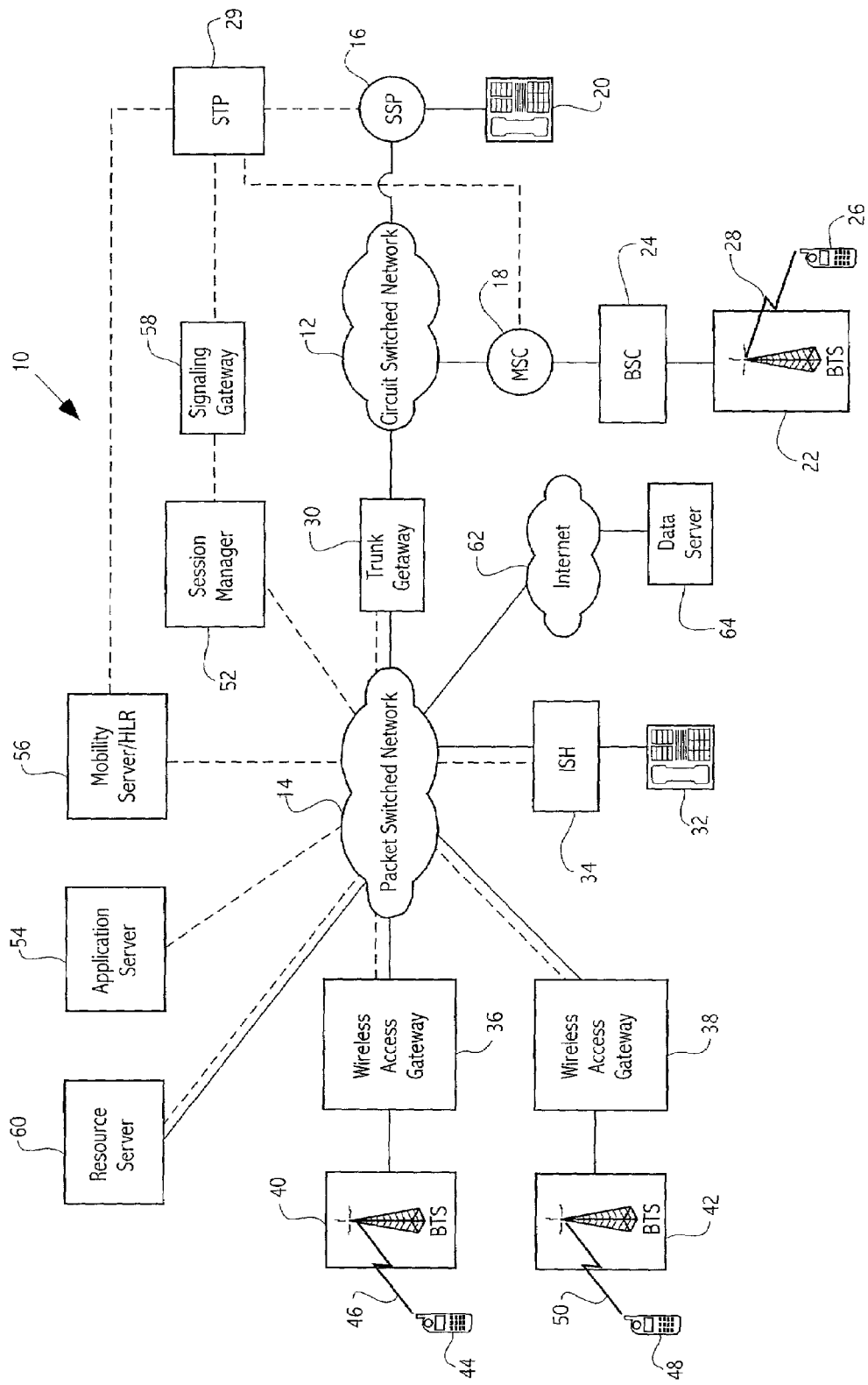
FIG. 1 is a block diagram illustrating a system arranged in accordance with an exemplary embodiment of the present invention.

Referring to FIG. 1, there is shown a simplified block diagram of an overall telecommunications network 10 arranged in accordance with an exemplary embodiment of the present invention. In FIG. 1, communication links that carry primarily content or bearer traffic are shown in solid lines, communication links that carry primarily signaling traffic are shown in dashed lines, and communication links that carry both content and signaling traffic are shown as a solid line adjacent to a dashed line.

It should be understood that this and other arrangements described herein are shown for purposes of illustration only, and those skilled in the art will appreciate that other arrangements and other elements (e.g., machines, interfaces, functions, etc.) can be used instead, and some elements may be omitted altogether. Further, those skilled in the art will appreciate that many of the elements described herein are functional entities that may be implemented as discrete components or in conjunction with other components, in any suitable combination and location. For example, where two entities are shown coupled by an interface, other intermediate entities or interfaces may be provided. Other examples are possible as well.

Still further, various functions that will be described herein as being performed by one or more entities may be carried out by a processor executing an appropriate set of machine language instructions stored in memory. Provided with the present disclosure, those skilled in the art can readily prepare appropriate computer instructions to perform such functions.

As shown in FIG. 1, overall network 10 includes a circuit switched network 12 and a packet switched network 14. Circuit switched network 12 may, for example, be the public switched telephone network (PSTN). Circuit switched network 12 is typically connected to various switching systems that may be part of circuit switched wireline networks or circuit switched wireless networks. For example, FIG. 1 shows network 12 connected to a service switching point (SSP) 16, as a representative switching system in a wireline network, and to a mobile switching center (MSC) 18, as a representative switching system in a wireless network.

SSP 16, in turn, is typically connected to a plurality of wireline stations, which may be telephones, fax machines, modems, or other such devices. For example, FIG. 1 shows a telephone 20 connected to SSP 16.

MSC 18 is connected to one or base transceiver stations (BTSs) or base stations, optionally via one or more base station controllers (BSCs). Each BTS, in turn, provides a wireless coverage area within which the BTS is typically able to communicate with one or more mobile stations over an air interface. Such mobile stations may be wireless telephones, personal digital assistants (PDAs) with wireless capability, or other such devices. For example, FIG. 1 shows MSC 18 connected to a BTS 22 via a BSC 24. BTS 22, in turn, is in communication with a mobile station 26 over an air interface 28. The wireless communication between mobile station 26 and BTS 22 over air interface 28 may be in an analog format, such as the Advanced Mobile Phone Service (AMPS), or it may be in a digital format, such as Time Division Multiple Access (TDMA), Group Speciale Mobile (GSM), or Code Division Multiple Access (CDMA).

Typically, SSP 16 and MSC 18 use a signaling system, such as SS7, to set up calls through circuit switched network 12. Such signals are usually routed via one or more signal transfer points (STPs), such as STP 29, as shown in FIG. 1.

Packet switched network 14 routes packets, typically in accordance with a specific protocol, such as TCP/IP, ATM, or IP/ATM. The packets will typically conform to a specified format, and, depending on the specified format, the packets may be required to have a fixed length or they may be of variable length. Typical packet formats specify that each packet has a header field and a payload field. The packet header typically includes a destination address, identifying the intended destination of the packet, and may also include a source address, identifying the source of the packet. For example, in TCP/IP the packets may be variable length, and the packet headers will typically include a destination IP address, a source IP address, as well as other information. In ATM, each packet is a fixed length "cell." Each cell has a header that specifies the cell's destination by a virtual path identifier (VPI) and a virtual channel identifier (VCI) and that also may include other information. In preferred embodiments, packet network 14 is an IP/ATM broadband network.

The payload of a packet may include content, signaling, and, optionally, codes, such as error correction codes. The content may correspond to voice, data, video, other media, or a combination of the foregoing, typically in a specified digital format. Moreover, the content or signaling may be in a compressed, encrypted, or otherwise encoded format.

Packet network 14 may be connected to, and may include, many different types of devices. Such devices may be the sources or destinations of the content, or they may be gateways for transmitting the content between packet network 14 and other networks or systems. In particular, packet network 14 may be connected to circuit switched network 12 via one or more trunk gateways, such as trunk gateway 30 shown in FIG. 1. As described in more detail below, trunk gateway 30 forwards content between packet switched network 14 and circuit switched network 12 and may, in the process, change the format of the content. Trunk gateway 30 is also typically able to engage in signaling though packet network 14, as shown in FIG. 1 and as described in more detail below.

Various user devices also typically have access to packet network 14, either directly or via one or more interface or gateway systems and/or one or more communication links, which may be circuit-based. Such user devices may include telephones, which may be either wireline or wireless, other devices providing voice services, personal computers, other devices that provide data services, or many other types of devices. In exemplary embodiments, such user devices may be connected to packet network 14 via an integrated services hub (ISH), as described in U.S. application Ser. No. 09/639, 720, filed Aug. 16, 2000, which is fully incorporated herein by reference. For example, FIG. 1 shows a telephone-type user device 32 connected to packet switched network 14 via an ISH 34. As shown in FIG. 1, ISH 34 exchanges both content and signaling with packet network 14. For example, ISH 34 may be connected to packet network 14 via an asymmetric digital subscriber line (ADSL).

In network 10, mobile stations are also able to access packet switched network 14 via wireless access gateways (WAGs). More particularly, mobile stations are able to communicate, over an air interface, with BTSs, which, in turn, are connected to packet network 14 via one or more WAGs. The communication between the mobile stations and the BTSs may be in either an analog format, such as AMPS, or a digital format, such as CDMA. As described in more detail below, the WAGs forward content and signaling between the BTSs to which they are connected and packet network 14. More particularly, in exemplary embodiments, WAGs take the place of MSCs and BSCs, by performing many of the functions that MSCs and BSCs provide in circuit-witched wireless networks. Also, as described in more detail below, the WAGs may also change the format of the content between that used by the BTSs and that used by other elements in network 10.

In the exemplary embodiment shown in FIG. 1, packet network 14 is connected to a first WAG 36 and a second WAG 38, typically for exchanging both content and signaling. WAG 36 is connected to a BTS 40, and WAG 38 is connected to a BTS 42. BTSs 40 and 42 each provide a wireless coverage area, which may be termed a "cell" or a "sector," within which it is able to engage in wireless communication with one or more mobile stations. As an illustrative, FIG. 1 shows a mobile station 44 in communication with BTS 40 over an air interface 46 and a mobile station 48 in communication with BTS 42 over an air interface 50. The size of the wireless coverage areas provided by BTSs 40 and/or 42 can vary, depending on implementation. If BTSs 40 and 42 are part of a public wireless network, then their wireless coverage areas may be relatively large, such as part of a city. Alternatively, BTSs 40 and 42 may be used in an enterprise network, in which case their wireless coverage areas may be much smaller and may extend only to the building, part of a building, or complex of buildings used by the enterprise. BTSs 40 and 42 may also be placed in residential locations, in which case their wireless coverage areas may extend only to the individual residences.

Mobile stations 44 and 48 may also be able communicate with circuit switched wireless networks. For example, mobile stations 44 and 48 may be able to communicate with BTS 22 shown in FIG. 1. Similarly, mobile stations, such as mobile station 26, that subscribe to circuit switched wireless networks may also be able to communicate with BTSs 40 or 42 and, thereby, access packet network 14 via WAG 36 or 38, respectively. Accordingly, mobile station 44, for example, may have a home location that correspond to WAG 36 or 38, in which case the directory number (DN) assigned to it would typically correspond to trunk gateway 30. Alternatively, mobile station 44 may have a home location in a circuit switched wireless network, in which case the DN assigned to it would typically correspond to an MSC, such as MSC 18.

A session manager 52 controls the routing of some or all of the packets in packet network 14. More particularly, session manager 52 sets up and tears down sessions through packet network 14, typically by issuing instructions to one or more of the network elements connected to packet network 14 that are involved in each session. Thus, session manager 52 is able to send signaling to and receive signaling from trunk gateway 30, ISH 34, and WAGs 36 and 38, typically via packet network 14, as shown in FIG. 1.

In preferred embodiments, session manager 52 is also able to communicate with an application server 54 and with a mobility server 56, typically via packet network 14, as shown in FIG. 1. As described in more detail below, application server 54 has access to service logic for providing telecommunications services. Application server 54 may also have access to user profiles that specify which telecommunications services are available to which users. Thus, session manager 52 can query application server 54 and, in response, receive instructions on how session manager 52 should control the session through packet network 14 in order to provide telecommunication services for the user.

Mobility server 56 keeps track of the location and status of subscribing mobile stations, such as, for example, mobile stations 26, 44, and 48. Thus, mobility server 56 typically performs the functions of a home location register (HLR) used in wireless networks. Indeed, mobility server 56 may also serve as the HLR for mobile stations subscribing to circuit switched wireless networks, e.g., mobile stations that have MSC 18 as their home location. Alternatively, other means may be used to perform mobility management. See, e.g., U.S. patent application entitled "Method and System for Providing Services in Communications Networks," filed Nov. 8, 2000.

Preferably, session manager 52 is also connected, via a signaling gateway 58, to the signaling system(s) used by network elements connected to circuit switched network 12, such as SSP 16 and MSC 18, for example, to route calls through circuit switched network 12. Thus, signaling gateway 58 may be connected to one or more STPs, such as STP 29, as shown in FIG. 1.

One or more resource servers, such as resource server 60, may also be connected to packet network 14. Such resource servers provide resources to users of packet network 14, as directed by session manager 52. For example, resource server 60 may be able to play voice announcements, as instructed by session manager 52. Resource server 60 may also provide storage for messages, such as voice mail messages and/or e-mail messages.

Packet network 14 may also be connected to, or be a part of, other networks, such as the Internet 62, as shown in FIG. 1. In this way, users of packet network 14 may also access various servers connected to Internet 62, such as exemplary data server 64, as shown in FIG. 1.

Figure 2:
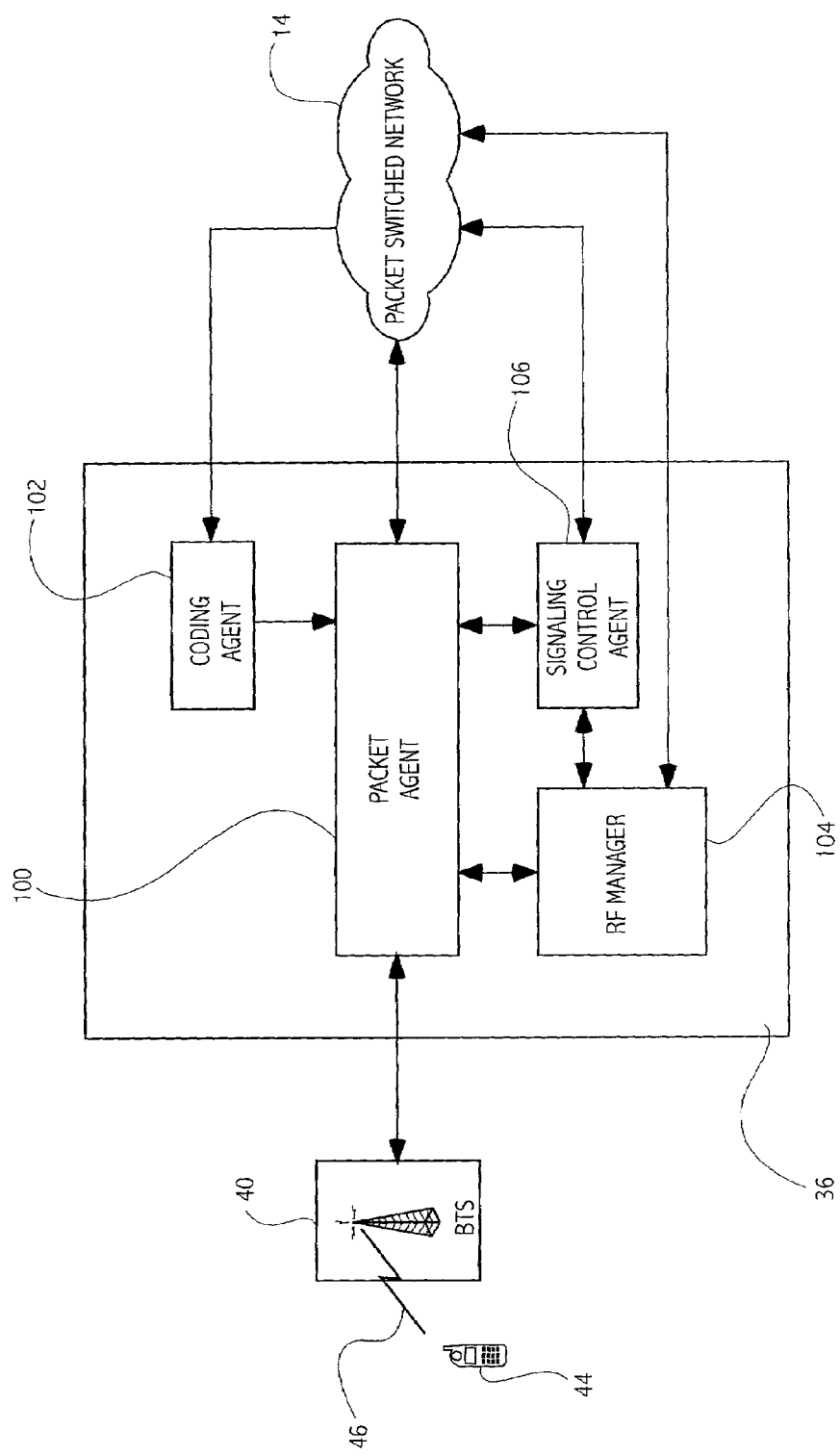
FIG. 2 is a block diagram providing a more detailed illustration of part of the system of FIG. 1.

FIG. 2 shows part of network 10 at a higher level of detail in order to show the functional units that comprise WAG 36. The functional units that comprise WAG 38 would typically be similar. The arrows in FIG. 2 indicate the directions that content and signaling typically flow.

As shown in FIG. 2, WAG 36 is made up of four functional units, namely, a packet agent 100, a coding agent 102, an RF manager 104, and a signaling control agent 106. Packet agent 100 performs packetization and depacketization functions for WAG 36. In its packetization function, packet agent 100 encapsulates content and signaling from BTS 40 into one or more packets and transmits the packets to packet network 14. Typically, as part of the packetization process, packet agent 100 inserts an appropriate destination address into the packet headers, so that packet network 14 will be able to route the packets appropriately.

In its depacketization function, packet agent 100 receives packets, typically from either packet network 14 or coding agent 102, and extracts the content or signaling contained in the packet payloads. Packet agent 100 then transmits the extracted content or signaling to BTS 40.

Coding agent 102 performs a transcoding function for WAG 36. Specifically, coding agent 102 receives packets from packet network 14, transcodes the content contained in the packets into a different format, and then transmits the packets containing the transcoded content to packet agent 100. Typically, coding agent 102 transcodes the content into a format used by the mobile station that is intended to receive it. For example, voice carried over trunk lines in the PSTN is typically in a time domain multiplexed (TDM) format. However, mobile stations that use CDMA typically send and receive voice transmissions that are encoded in a particular compressed format, typically a CELP format or an RCELP format, such as EVRC. For CDMA systems, EVRC is preferred. In such cases, coding agent 102 will transcode the content contained in the packets into the encoded format, such as EVRC, used by the recipient mobile station.

RF manager 104 performs RF management functions, such as keeping track of wireless capacity, performing admission control and burst allocation/deallocation, and managing handoffs of mobile stations within its jurisdiction. RF manager 104 also approves or denies requests to use RF resources. Similarly, RF manager 104 may control RF resources so as to provide a particular quality of service (QoS) level or to do policy enforcement. RF manager 104 may accomplish these RF management functions in various ways. For example, RF manager 104 may send signals to packet agent 100 instructing it how, when, or whether to forward signaling or content to BTS 40.

RF manager 104 may also perform physical layer functions for the wireless communication with mobile stations. For example, RF manager 104 may apply Walsh codes to provide the orthogonal spreading needed in CDMA communications. In this regard, packet agent 100 may send packets to RF manager 104 for physical layer signal processing. When RF manager 104 completes the physical layer signal processing, it may send packets with the processed signals back to packet agent 100 for forwarding to BTS 40, as shown in FIG. 2.

Signaling control agent 106 acts as a slave to session manager 52 to control calls through WAG 36. In particular, signaling control agent 106 receives control messages from session manager 52 and, in turn, sends instructions to packet agent 100 and RF manager 104. Signaling control agent 106 may also send query messages to session manager 52 for call processing instructions, typically in response to queries from packet agent 100 or RF manager 104.

The signaling between signaling control agent 106 and session manager 52 will typically conform to a predetermined protocol. A preferred protocol is Recommendation H.248 of the International Telecommunication Union (ITU), which is entitled "Gateway Control Protocol." Other protocols that could be used include the Master Gateway Control Protocol (MGCP) and the Simple Gateway Control Protocol (SGCP), developed by Bellcore (which is now Telcordia).

Packet agent 100, coding agent 102, RF manager 104, and signaling control agent 106 are preferably all packet-based platforms, i.e., they are able to communicate with one another using packets. Moreover, each of these functional units will typically have one or more addresses by which they are identified on packet network 14. Further, while these functional units operate together as WAG 36, they may be physically remote. Accordingly, packet network 14 may route the packets with which these functional units communicate with each other. Some of these functional units may even provide functionality for more than one WAG.

B. EXEMPLARY SYSTEM OPERATION

The operation of the wireless access gateways (WAGs) in exemplary embodiments of the present invention is further explained herein by describing representative call flows involving mobile stations being served by a WAG. With reference to FIGS. 1 and 2, one such representative call is the case of a wireline station, such as telephone 20, calling a mobile station being served by a WAG, such as mobile station 44, in communication with BTS 40 over air interface 46. The process will typically begin when the user of wireline telephone 26 dials a DN for mobile station 44. If mobile station 44 has a WAG as its home location, then the dialed DN will normally correspond to trunk gateway 30. Accordingly, circuit switched network 12 will route the call to trunk gateway 30 and will signal session manager 52 via signaling gateway 58.

When session manager 52 receives the request to route the call to the dialed DN, session manager 52 will typically consult application server 54 to determine whether any call termination services may be applicable. Accordingly, session manager 52 sends to application server 54, typically via packet network 14, a query message that includes the dialed DN. Application server 54 then accesses its user profiles to determine from the dialed DN the user involved and what telecommunications services are applicable. If telecommunications services are applicable, then application server 54 will typically execute service logic to formulate instructions for processing the call. Application server 54 sends session manager 52 a response message containing call processing instructions. In the simplest case, the call processing instructions would indicate that the call should simply be routed to mobile station 44. In other cases, application server 54 may, for example, instruct session manager 52 to screen the call, to send the call to resource server 60, or to route the call to another DN.

If the call is to be routed to mobile station 44, then session manager 52 would send mobility server/HLR 56 a query message, typically via packet network 14, in order to determine how to reach mobile station 44. Mobility server/HLR 56 would have the information that mobile station 44 is currently being served by WAG 36 and would so indicate in a response message to session manager 52. Typically, the response message will include a destination address corresponding to WAG 36. More particularly, the destination address would typically correspond to coding agent 102 in WAG 36. Session manager 52 would then instruct trunk gateway 30 to send the call corresponding to the dialed DN to the destination address corresponding to coding agent 102.

Session manager 52 would also send instructions to signaling control agent 106 to prepare WAG 36 to receive the call through packet network 14. For example, signaling control agent 106 may, in turn, instruct RF manager 104 to allocate RF resources for the call. Signaling control agent 106 may also, for example, instruct packet agent 100 that content from coding agent 106 is to be sent to BTS 40 or to RF manager 104 for physical layer processing.

Once session manager 52 has set up the session through packet network 14, by appropriately instructing WAG 36 and trunk gateway 30, the session proceeds as follows. Trunk gateway 30 receives the content routed through circuit switched network 12, which will typically be in a TDM format, and packetizes it for transmission through packet network 14. Trunk gateway 30 typically inserts the destination address of coding agent 102 into the packets.

Packet network 14 then routes the packets to coding agent 102. Coding agent 102 receives the packets, transcodes the content from the TDM format into a format appropriate for mobile station 44, such as EVRC, and forwards the transcoded packets to packet agent 100. Typically, packet agent 100 then depacketizes the transcoded packets into frames of content that it then forwards to BTS 40. BTS 40, in turn, transmits the frames of content over air interface 46 to mobile station 44. Alternatively, packet agent 100 may forwarded the packets to BTS 40 without depacketization.

Optionally, before it depacketizes the transcoded packets, packet agent 100 may first send the transcoded packets to RF manager 104 for physical layer processing, such as application of Walsh codes for orthogonal spreading. In that case, RF manager 104 would process the packets accordingly and send the process packets to packet agent 100 for depacketization and transmission to BTS 40.

If the mobile station has MSC 18 as a home location, then the call flow differs from the previous example in that circuit switched network 12 first routes the call to MSC 18. In addition, because in this example mobile station 44 is not in a coverage area served by MSC 18, MSC 18 would query mobility server/HLR 56, such as via STP 29, in order to determine how to route the call to mobile station 44, e.g., to obtain a temporary location directory number (TLDN) for mobile station 44. MSC 18 will typically include the dialed DN in its query to mobility server/HLR 56.

When it receives the query, mobility server/HLR 56 identifies mobile station 44 from the dialed DN and determines that mobile station 44 is being served by WAG 36. Mobility server/HLR 56 then sends a message to session manager 52 notifying it that a call to mobile station 44, which is being served by WAG 36, is requested. Preferably, session manager 52 then queries application server 54 to determine whether call termination services are applicable, as described above. If the instructions from application server 54 are that the call is to be routed to mobile station 44, then session manager 52 sets up a session through packet network 14 by sending instructions to WAG 36 and to trunk gateway 30, as described above.

Mobility server/HLR 56 also obtains a TLDN, corresponding to trunk gateway 30, to use for the call. Mobility server/HLR 56 may obtain this TLDN by querying either session manager 52 or trunk gateway 30. Mobility server/HLR 56 then forwards this TLDN to MSC 18. Using this TLDN, MSC 18 routes the call through circuit switched network 12 to trunk gateway 30. Trunk gateway 30, in turn, packetizes the content and transmits it to coding agent 102 through packet network 14, as described above.

Another exemplary call flow is the case of a call originating from a mobile station served by the WAG, such as mobile station 44 being served by WAG 36. The user of mobile station 44 dials a DN, and mobile station 44 transmits a call origination request message over air interface 46 to BTS 40. The call origination request message typically comprises one or more signaling frames and includes the dialed DN. BTS 40, in turn, sends the signaling frames to packet agent 100. Packet agent 100 packetizes the signaling frames and forwards the packets to RF manager 104. RF manager 104 then either approves or disapproves the call, based on whether sufficient RF capacity is available. If RF manager 104 approves the call, it sends the packets containing signaling frames to signaling control agent 106, which, in turn, sends a query message to session manager 52. The query message will typically include the dialed DN and at least one parameter identifying mobile station 44, such as a mobile identification number (MIN).

Preferably, session manager 52 then queries application server 54 to determine whether any call origination services are applicable. More particularly, session manager 52 forwards the MIN, or other parameter identifying mobile station 44, and, typically, other information, such as the dialed DN, to application server 54. Application server 54, in turn, consults the user's service profile information and may execute appropriate service logic to formulate call processing instructions. Application server 54 sends the call processing instructions in a response message to session manager 52. If the call is to be routed to the dialed DN, then session manager 52 determines whether the dialed DN corresponds to one of the DNs allocated to packet switched network 14.

If the dialed DN is not such an allocated DN, then the call must be routed to circuit switched network 12. For example, the dialed DN may correspond to wireline station 20. In that case, session manager 52 sets up a session through packet network 14 by sending instructions to trunk gateway 30 and to WAG 36. More particularly, session manager 52 allocates a destination address corresponding to trunk gateway 30 to use for the session, and session manager 52 sends instructions to signaling control agent 106 that packet agent 100 should send packets to the allocated destination address. Signaling control agent 106, in turn, provides the allocated destination address to packet agent 100. Session manager 52 also sets up the call through circuit switched network 12 by signaling SSP 16 via signaling gateway 58 and STP 29.

Once the session is set up, packet agent 100 receives content frames from BTS 40. These content frames will typically be in a format used by mobile station 44, such as EVRC encoded voice. Packet agent 100 packetizes the content, using the allocated destination address, and transmits the packets to packet network 14. Packet network 14, in turn, routes the packets to trunk gateway 30. Trunk gateway 30 depacketizes these packets and, preferably, transcodes the content into the TDM format used by circuit switched network 12. Trunk gateway 30 then transmits the content in TDM format through circuit switched network 12 to SSP 16, to which wireline station 20 is connected.

In the case that the dialed DN corresponds to a mobile station having a WAG as its home location, session manager 52 sends a query containing the dialed DN to mobility server/HLR 56 to find the called mobile station's location. For example, the dialed DN may correspond to mobile station 48, as shown in FIG. 1, in which case, mobility server/HLR 56 would send a response message to session manager 52 indicating that mobile station 48 is being served by WAG 38. Session manager 52 then sets up a session through packet network 14 by sending instructions to signaling control agent 106 in WAG 36 and to the corresponding signaling control agent in WAG 38. More particularly, session manager 52 would provide signaling control agent 106 with a destination address corresponding to the packet agent of WAG 38. Once the session is set up, BTS 40 forwards to packet agent 100 the content frames it receives over air interface 46 from mobile station 44. Packet agent 100 then packetizes the content frames, using the destination address provided by session manager 52, and transmits the packets to packet switched network 14. Network 14, in turn, routes the packets to the Packet Agent in WAG 38, which depacketizes them back into content frames and forwards the content frames to BTS 42. BTS 42 then transmits the content frames over air interface 50 to mobile station 48. In this case, mobile stations 44 and 48 typically use content in the same format, so that no transcoding is required.

Other dialed DNs may correspond to other user devices accessible through packet network 14. For example, the dialed DN may correspond to telephone 32 connected to ISH 34. In that case, session manager 52 would set up the session by providing WAG 36 with a destination address corresponding to ISH 34. Further, when such other user devices are called, transcoding of the content may be required. For example, ISH 34 may use a pulse code modulated (PCM) format. To accomplish such transcoding, the user device itself, such as ISH 34, may be provided with a transcoder. Alternatively, WAG 36 may send the packets to coding agent 102 for the transcoding.

C. EXEMPLARY SYSTEM ADVANTAGES

The exemplary embodiments described above can provide a number of advantages over existing systems. Fundamentally, these exemplary embodiments provide a way of integrating wireless access functionality into the NGN approach. Accordingly, reliance on switches may be reduced in favor of the more generic interfaces that packet-based platforms are typically able to provide. Moreover, the exemplary apportionment of functionality into the functional units described above, i.e., packet agent, coding agent, RF manager, and signaling control agent provides a more modular network design that can be easier to troubleshoot and to update. The ability of these functional units to be spread out geographically and to function in more than WAG makes network design more flexible. The packet-based nature of the approach may also allow more seamless use of wireless data functionality. However, in addition to being compatible with the NGN approach, these exemplary embodiments are able to co-exist with legacy circuit switched wireline and wireless networks.

D. CONCLUSION

Although exemplary embodiments of the present invention have been described herein, it is to be understood that changes and modifications may be made thereto without deviating from the true spirit and scope of the invention, as defined by the claims.

For example, although WAG 36 is shown connected to BTS 40 in the exemplary embodiments, WAG 36 may, alternatively, be connected to other types of wireless transceivers. For example, WAG 36 may be connected to a wireless transceiver for short-range wireless communications, such as Bluetooth. Alternatively, WAG 36 may be connected to a wireless transceiver for wireless local area network (WLAN) functionality, such as specified in the 802.11 standard developed by the Institute of Electrical and Electronics Engineers (IEEE). Still other types of wireless transceivers could also be used.

As an other possible modification of the exemplary embodiments, although FIG. 1 shows only a single session manager, in general, more than one session manager may be associated with packet network 14. More particularly, multiple session managers may be authorized to control a given WAG, such as WAG 36 or 38. Other modifications to the exemplary embodiments are also possible.

What is claimed is:

1. A wireless access gateway for providing a telecommunications link between a base transceiver station (BTS) and a packet switched network, said BTS providing a wireless coverage area for wireless telecommunication with at least one mobile station, said wireless access gateway comprising:
a packet agent in communication with said BTS and with said packet network, said packet agent packetizing frames from said BTS into packets, said packet agent depacketizing packets into frames for said BTS;
a coding agent in packet communication with said packet agent, said coding agent transcoding content contained in packets from a first format to a second format;
a radio frequency (RF) manager in packet communication with said packet agent, said RF manager performing RF management of said BTS; and
a signaling control agent in packet communication with said packet agent, said signaling control agent controlling said packet agent.

2. The wireless access gateway of claim 1, wherein said coding agent transcodes content from a time division multiplexed (TDM) format to a vocoder format.

3. The wireless access gateway of claim 2, wherein said vocoder format is a code excited linear predictive (CELP) vocoder format.

4. The wireless access gateway of claim 2, wherein said vocoder format is a relaxed code excited linear predictive (RCELP) vocoder format.

5. The wireless access gateway of claim 4, wherein said vocoder format is an enhanced variable rate coder (EVRC) format.

6. The wireless access gateway of claim 1, wherein said RF manager performs wireless physical layer functions for said BTS.

7. The wireless access gateway of claim 1, wherein said signaling control agent is in packet communication with a session manager.

8. The wireless access gateway of claim 7, wherein said signaling control agent controls said packet agent in response to instructions from said session manager.

9. A method for using a first wireless access gateway to originate a call from a mobile station via a packet switched network, said first wireless access gateway including a packet agent and a signaling control agent, said method comprising the steps of:
receiving, over an air interface, a call origination request from said mobile station;
a packet agent packetizing said call origination request to provide at least one call origination packet;
said packet agent transmitting said at least one call origination packet to said signaling control agent;
said packet agent receiving at least one instruction packet from said signaling control agent, said at least one instruction packet instructing said packet agent to transmit packets containing content from said mobile station to a destination address in said packet switched network.

10. The method of claim 9, further comprising the step of:
said signaling control agent transmitting, via said packet switched network, a first query message to a session manager.

11. The method of claim 10, further comprising the step of:
said signaling control agent receiving, via said packet switched network, a first response message from said session manager.

12. The method of claim 11, wherein said first response message includes said destination address.

13. The method of claim 12, further comprising the steps of:
said session manager transmitting, via said packet switched network, a second query message to an application server; and
said session manager receiving, via said packet switched network, a second response message from said application server.

14. The method of claim 12, wherein said destination address corresponds to a trunk gateway, said trunk gateway being connected to a circuit switched network, said method further comprising the step of:
said session manager sending, via said packet switched network, an instruction message to said trunk gateway.

15. The method of claim 14, further comprising the step of:
said session manager signaling, via a signaling gateway, to set up a circuit switched communication link through said circuit switched network from said trunk gateway.

16. The method of claim 12, further comprising the step of:
said session manager sending, via said packet switched network, a third query message to a mobility server; and
said session manager receiving, via said packet switched network, a third response message from said mobility server, wherein said destination address corresponds to a second wireless access gateway.

17. A method for setting up a call to a mobile station via a circuit switched network and a packet switched network, said mobile station operating in a wireless coverage area served by a wireless access gateway, said wireless access gateway including a packet agent, a coding agent, and a signaling control agent, said method comprising the steps of:
a session manager receiving, via a signaling gateway, a request from said circuit switched network to terminate a call to said mobile station;
said session manager sending, via said packet switched network, a first instruction message to a trunk gateway, said trunk gateway being connected to said circuit switched network, said first instruction message instructing said trunk gateway to transmit packets containing content from said circuit switched network to a destination address in said packet switched network, said destination address corresponding to said coding agent.

18. The method of claim 17, further comprising the step of:
said session manager sending a second instruction message to said signaling control agent, said second instruction message instructing said signaling control agent to control said packet agent to receive packets from said coding agent.

19. The method of claim 18, further comprising the steps of:

said session manager sending, via said packet switched network, a first query message to a mobility server; and said session manager receiving, via said packet switched network, a first response message from said mobility server.

20. The method of claim 19, wherein said first response message includes said destination address.

21. The method of claim 19, further comprising the steps of:

said session manager sending, via said packet switched network, a second query message to an application server; and said session manager receiving, via said packet switched network, a second response message from said application server.

* * * * *